(12) United States Patent
Ono

(10) Patent No.: US 7,456,874 B1
(45) Date of Patent: Nov. 25, 2008

(54) IMAGE SELECTING APPARATUS, CAMERA, AND METHOD OF SELECTING IMAGE

(75) Inventor: Shuji Ono, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 1009 days.

(21) Appl. No.: 09/586,601

(22) Filed: Jun. 2, 2000

(30) Foreign Application Priority Data

Jun. 4, 1999 (JP) .............................. H11-158668

(51) Int. Cl.
  H04N 5/262 (2006.01)
  H04N 5/225 (2006.01)
  H04N 5/232 (2006.01)
  G06K 9/00 (2006.01)
  G06K 9/46 (2006.01)

(52) U.S. Cl. .................. 348/239; 348/218.1; 348/349; 348/350; 382/106; 382/190; 382/195

(58) Field of Classification Search .............. 348/218.1, 348/345, 350, 239, 349; 382/106, 190, 192, 382/195, 201, 182
See application file for complete search history.

(56) References Cited

U.S. PATENT DOCUMENTS

| | | | |
|---|---|---|---|
| 5,850,470 A * | 12/1998 | Kung et al. ................. | 382/118 |
| 5,878,156 A * | 3/1999 | Okumura ..................... | 382/118 |
| 5,905,807 A * | 5/1999 | Kado et al. .................. | 382/118 |
| 6,184,926 B1 * | 2/2001 | Khosravi et al. ............ | 348/239 |
| 6,226,396 B1 * | 5/2001 | Marugame ................... | 382/154 |
| 6,262,778 B1 * | 7/2001 | Nonweiler et al. .......... | 348/586 |
| 6,504,944 B2 * | 1/2003 | Mihara et al. ............... | 382/118 |
| 6,606,117 B1 * | 8/2003 | Windle ........................ | 348/239 |
| 6,823,080 B2 * | 11/2004 | Iijima et al. ................. | 382/154 |
| 6,940,545 B1 * | 9/2005 | Ray et al. ................. | 348/222.1 |
| 2002/0085747 A1 * | 7/2002 | Yoshigahara et al. ........ | 382/154 |
| 2003/0193610 A1 * | 10/2003 | Nozaki et al. ............... | 348/345 |

FOREIGN PATENT DOCUMENTS

| JP | 9-212620 | 8/1997 |
|---|---|---|
| JP | 10-191216 | 7/1998 |

* cited by examiner

Primary Examiner—Nhan T Tran
(74) Attorney, Agent, or Firm—Birch, Stewart, Kolasch & Birch, LLP

(57) ABSTRACT

An image selecting apparatus comprises an input unit 20, an A/D converter 30, a memory 40, a control unit 50, a recording unit 90, and an output unit 92. The input unit 20 continuously photographs a subject and inputs the data of the images. The A/D converter 30 converts the analog signal of the images received from the input unit 20 to digital signals. The memory 40 stores a plurality of images output from the input unit 20. The control unit 50 selects a desired image from the plurality of images stored in the memory 40. The recording unit 90 records the selected desired image and the output unit 92 outputs the selected desired image.

19 Claims, 9 Drawing Sheets

IMAGE SELECTING APPARATUS, CAMERA, AND METHOD OF SELECTING IMAGE

This patent application claims priority based on Japanese patent application, H11-158668 filed on Jun. 4, 1999, the contents of which are incorporated herein by reference.

BACKGROUND OF THE INVENTION

1. Field of the Invention

The present invention relates to an image selecting apparatus and a camera, and more particularly to an image selecting apparatus and a camera capable of automatically selecting a desired image from among a plurality of photographed images.

2. Description of the Related Art

Conventionally, a technique is known to correct a photograph so that a person photographed by a camera can be satisfied with the result. However, this technique requires a high degree of skill. Furthermore, it is difficult to correct a person's face in the photograph when he or she is blinking or is not smiling, to a face as if he or she is not blinking or is smiling.

On the other hand, Japanese Patent Laid-open Publication (Kokai) H9-212620 and Japanese Patent Laid-open Publication (Kokai) H10-191216 disclose a technique to continuously photograph a plurality of images. Those images are displayed, and the person photographed by the camera can select a desirable image from among those images.

However, this was troublesome because the photographed person or the photographer needed to select the desired image by checking all of the images. Furthermore, when a lot of people are photographed in the image, it is more difficult to select an image that all of them are satisfied with.

SUMMARY OF THE INVENTION

Therefore, it is an object of the present invention to provide an image selecting apparatus, a camera, and a method of selecting an image, which overcomes the above issues in the related art. This object is achieved by combinations described in the independent claims. The dependent claims define further advantageous and exemplary combinations of the present invention.

In order to solve the above-stated problem, the first aspect of the present invention provides an image selecting apparatus for selecting a desired image from among a plurality of images obtained by continuously photographing a subject, comprising: an extractor extracting data of an aimed object from each of the plurality of images; a condition-storing unit storing a predetermined selection condition for a desirable aimed object; and a selecting unit selecting a desired image including a desired aimed object from among the plurality of images, the desired aimed object satisfying the predetermined selection condition stored in the condition-storing unit.

The extractor may extract the data of the aimed object based on depth information indicating the distance to each part of the subject.

The extractor may extract the data of the aimed object based on image information included in each of the images.

The extractor may detect a judgement location from the data of the aimed object based on image information included in each of the images, the selection condition may include a predetermined selection condition related to a desirable judgement location, and the selecting unit may select the desired aimed object including a judgement location satisfying the selection condition related to the desirable judgement location.

The extractor may extract data of a plurality of the aimed objects from each of the plurality of images; and the selecting unit may select a plurality of the desired aimed objects for each of the plurality of aimed objects.

The extractor may detect a plurality of judgement locations from each of the data of the plurality of aimed objects based on image information included in each of the images, the selection condition may include a predetermined selection condition related to a desirable judgement location, and the selecting unit may select the plurality of the desired aimed objects each including a judgement location satisfying the selection condition related to the desirable judgement location.

The selecting unit may further comprise an image-composite unit compositing the plurality of desired aimed objects to form a composite image, the composite image including the plurality of desired aimed objects for each of the plurality of aimed objects extracted from the plurality of images.

In order to solve the above-stated problem, the second aspect of the present invention provides a camera comprising: an input unit forming an image of a subject; an extractor extracting data of an aimed object from each of the plurality of images formed by the input unit; a condition-storing unit storing a predetermined selection condition for a desirable aimed object; and a selecting unit selecting a desired image including a desired aimed object from among the plurality of images, the desired aimed object satisfying the predetermined selection condition stored in the condition-storing unit.

The input unit may include a parallactic image data input unit inputting parallactic an image photographed from different view points, and the extractor may extract the data of the aimed object based on depth information indicating the distance to each part of the subject, the depth information being extracted from the parallactic image.

The selection condition may comprise a plurality of selection conditions, and the camera may further comprise a condition-setting unit previously selecting at least one of the selection conditions, for selecting the desired image, from among the plurality of selection conditions.

In order to solve the above-stated problem, the third aspect of the present invention provides a method of selecting a desired image from among a plurality of images obtained by continuously photographing a subject, comprising: extracting data of an aimed object from each of the plurality of images; and selecting a desired image including a desired aimed object from among the plurality of images, the desired aimed object satisfying a predetermined selection condition for a desirable aimed object.

The extracting may extract the data of the aimed object from each of the plurality of images based on depth information indicating the distance to each part of the subject.

The extracting may extract the data of the aimed object from each of the plurality of images based on image information included in each of the images.

The extracting may include detecting a judgement location from the data of the aimed object, the selection condition may include a predetermined selection condition related to a desirable judgement location, and the selecting may select the desired aimed object including a judgement location satisfying the selection condition related to the desirable judgement location.

The extracting may extract data of a plurality of the aimed objects from each of the plurality of images; and the selecting may select a plurality of the desired aimed objects for each of the plurality of aimed objects.

The extracting may include detecting a plurality of judgement locations from each of the data of the plurality of aimed objects, the selection condition may include a predetermined selection condition related to a desirable judgement location, and the selecting may select the plurality of the desired aimed objects each including a judgement location satisfying the selection condition related to the desirable judgement location.

In order to solve the above-stated problem, the fourth aspect of the present invention provides a recording medium storing therein a program executed by a computer to perform a method of selecting a desired image from among a plurality of images obtained by continuously photographing a subject, comprising: extracting data of an aimed object from each of the plurality of images; and selecting a desired image including a desired aimed object from among the plurality of images, the desired aimed object satisfying a predetermined selection condition for a desirable aimed object.

This summary of the invention does not necessarily describe all necessary features so that the invention may also be a sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
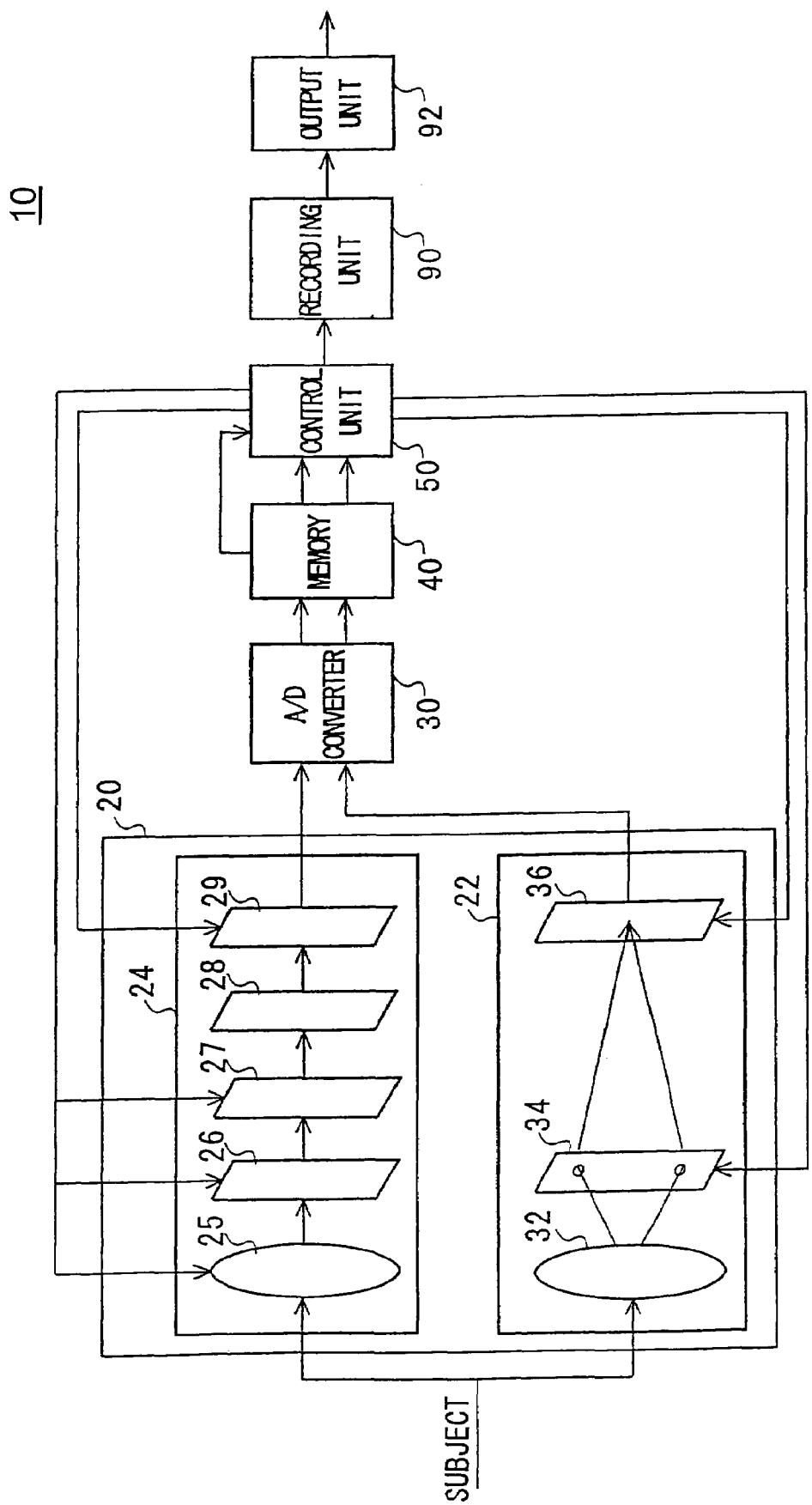
FIG. 1 shows a camera 10 of the first embodiment according to the present invention.

FIG. 1 shows a camera 10 of the first embodiment according to the present invention. The camera 10 continuously photographs a plurality of images and automatically selects a desired image from among the plurality of images based on a predetermined selection condition.

The camera 10 includes an input unit 20, an A/D converter 30, a memory 40, a control unit 50, a recording unit 90 and an output unit 92. The camera 10 may be, for example, a digital still camera or a digital video camera that can photograph a still image.

The input unit 20 includes a parallactic image data input unit 22 and a normal image data input unit 24. The parallactic image data input unit 22 inputs parallactic images which are photographed from different view points. The parallactic image data input unit 22 has a parallactic lens 32, a parallactic shutter 34, and a parallactic charge coupled device (CCD) 36. The parallactic lens 32 forms an image of a subject. The parallactic shutter 34 has a plurality of shutter units each of which serves as view points. The parallactic shutter 34 opens one of the plurality of shutter units. The parallactic CCD 36 receives the image of the subject through the parallactic lens 32 and whichever of the shutter units of the parallactic shutter 34 that are opened. The parallactic CCD 36 also receives another image of the subject through the parallactic lens 32 and another of the shutter units of the parallactic shutter 34, which is opened at this time. The images received through the parallactic lens 32 and the parallactic shutter 34 forms a parallactic image. Thus, the parallactic CCD 36 receives the parallactic image of the subject formed by the parallactic lens 32 and converts it to electronic signals.

The normal image data input unit 24 inputs a normal image photographed from a single viewpoint. The normal image data input unit 24 has a lens 25, a lens stop 26, a shutter 27, a color filter 28 and a charge coupled device (CCD) 29. The lens 25 forms an image of a subject. The lens stop 26 adjusts aperture condition. The shutter 27 adjusts exposure time. The color filter 28 separates RGB components of the light received through the lens 25. The CCD 29 receives the image of the subject formed by the lens 25 and converts it to electric signals.

The A/D converter 30 receives analog signals from the parallactic image data input unit 22 and the normal image data input unit 24. The A/D converter 30 converts the received analog signals to digital signals and outputs the digital signals to the memory 40. The memory 40 stores the input digital signals. It means that the memory 40 stores the data of the parallactic image, the subject photographed by the parallactic image data input unit 22, and the data of the normal image of the subject photographed by the normal image data input unit 24.

The control unit 50 selects a best image from among a plurality of normal images stored in the memory 40, based on a predetermined selection condition. The control unit 50 then outputs the data of the selected image. The control unit 50 controls at least one of the following operations: focus condition of the lens 25, aperture condition of the lens stop 26, exposure time of the shutter 27, output signal of the CCD 29, condition of the parallactic shutter 34, and the output signal of the parallactic CCD 36. The control unit 50 controls the input unit 20 to continuously photograph the plurality of images.

The recording unit 90 records the image output from the control unit 50. The recording unit 90 may be, for example, a magnetic recording medium such as a floppy disk, or a non-volatile memory such as flash memory. The output unit 92 outputs the image recorded on the recording unit 90. The output unit 92 may be, for example, a printer or a monitor. The output unit 92 may be a small liquid crystal display (LCD) of the camera 10. In this case, the user can see the image selected by the control unit 50 immediately after photographing the plurality of images.

Figure 2:
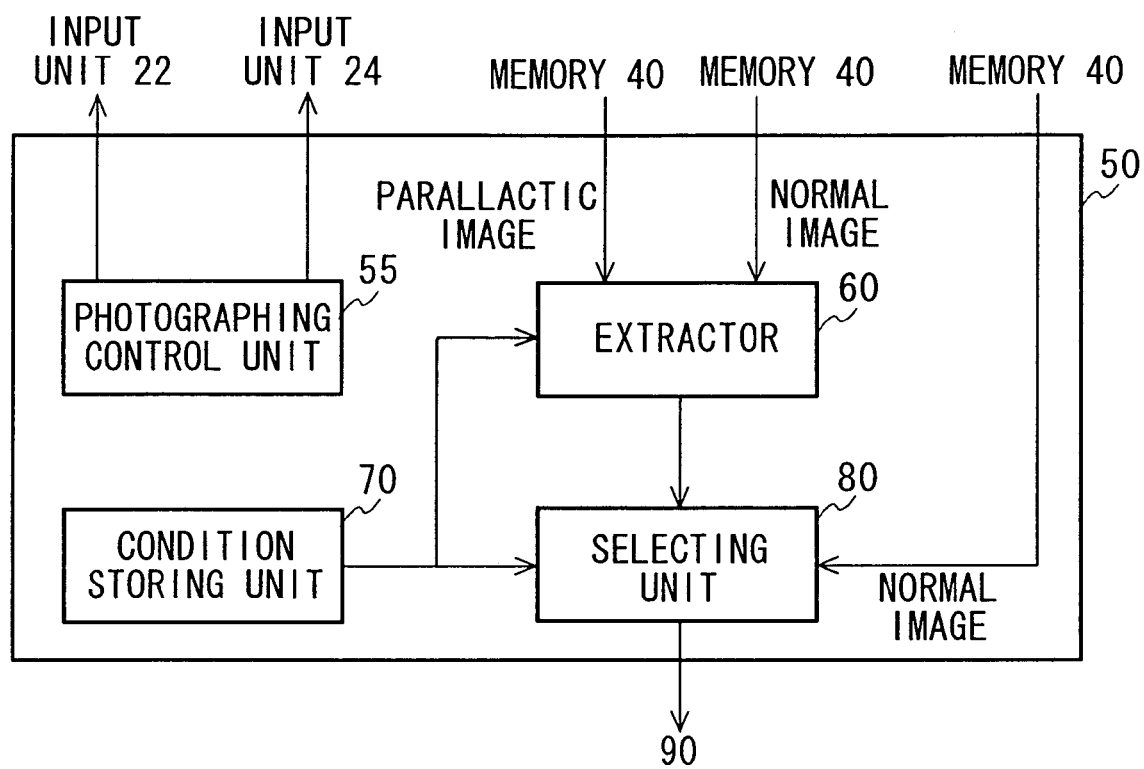
FIG. 2 is a block diagram of the control unit 50 according to the present embodiment.

FIG. 2 is a block diagram of the control unit 50 according to the first embodiment. The control unit 50 includes a photographing control unit 55, an extractor 60, a condition-storing unit 70 and a selecting unit 80.

The photographing control unit 55 controls at least one of the following: focus condition of the lens 25, focus condition of the parallactic lens 32, aperture condition of the lens stop 26, exposure time of the shutter 27, output signal of the CCD 29, condition of the parallactic shutter 34, and output signal of the parallactic CCD 36. The photographing control unit 55 controls the input unit 20, shown in FIG. 1, to continuously photograph a plurality of images.

The extractor 60 receives the data of the normal images from the memory 40. The extractor 60 extracts an aimed object from each of the normal images based on the information obtained from the parallactic images and the normal images. The information includes image information of the normal image and depth information of the parallactic image. The aimed object defined here is an independent object at which a photographer aims when photographing. The aimed object may be, for example, a person in a room when the person and the objects in the room are photographed, a fish in an aquarium when the fish and the aquarium are photographed, or a bird stopping on a branch of a tree when the bird and the tree are photographed.

The extractor 60 then detects a judgement location from the aimed object based on the information obtained from the parallactic images and the normal images. The judgement location defined here is a location to which specific attention is paid when selecting the desirable image. The judgement location may be, for example, an eye of a person when the person is photographed, or a wing of a bird when the bird is photographed. The aimed object may be an area including the judgement location, extracted for a certain purpose.

The condition-storing unit 70 stores predetermined selection conditions for selecting a best image, which will be referred to as a desired image, from among the plurality of normal images. The condition-storing unit 70 includes a condition-setting unit, not shown in the drawings, by which a user can select at least one of the selection conditions from among a plurality of selection conditions.

The selecting unit 80 selects a desired image which best satisfies the selection conditions stored in the condition-storing unit 70 and set by the condition-setting unit 71.

Since cameras are usually used to photograph human beings, a desired image means that the photographed person has a good appearance. The good appearance of the person may be when, for example, "the person is not blinking", "the person's eyes are not red-eyed", "the person is looking at the camera", or "the person is smiling".

In this embodiment, the method of selecting a desired image when a person is photographed will be explained. The condition-storing unit 70 stores conditions such as "the person is not blinking", "the person's eyes are not red-eyed", "the person is looking at the camera", and "the person is smiling" as the selection conditions. These selection conditions relate to the face of the person, and more specifically to eyes or mouth of the person. Therefore, it is assumed in this embodiment that the aimed object is the face area of the person and the judgement location is an eye or the mouth of the person.

Each of the selection conditions has a reference situation for the judgement location, which should meet the requirements of the selection condition. The condition-storing unit 70 also stores the reference situations for the judgement location, each respectively corresponding to each of the selection conditions. The reference situations for the judgement location corresponding to each of the selection conditions will be described in the following.

For the conditions such as "the person is not blinking", "the person's eyes are not red-eyed" and "the person is looking at the camera", the reference situation may relate to the shape of the eye, color of the eye, and size of the eye. For the condition such as "the person is smiling", the reference situation may also relate to the size of the eye, as well as shape of the mouth, and size of the mouth. Whether each of the judgement locations satisfy each of these reference conditions or not is judged in accordance with predetermined algorithms based on experience.

When the selection condition "the person is not blinking" is selected, the judgement location may be the eye of the person. The reference situation for the eye in this selection condition will be determined as follows. When a person blinks, his/her eyelid hides his/her eyeball. While he/she is blinking and his/her eye is partially closed, a white part of his/her eyeball is especially hidden by his/her eyelid. It means that when the person is not blinking, the white part of his/her eyeball should be relatively large. Therefore, the reference situation for the selection condition "the person is not blinking" becomes "the white part of his/her eyeball has a large dimension".

When the selection condition "the person's eyes are not red-eyed" is selected, the judgement location may be the eyes of the person. The reference situation for the eyes in this selection condition will be determined as follows. Eyes of a person are usually red-eyed when the person is photographed using a flash in a dark situation. This happens because the person's eyes cannot sensibly compensate for the sudden brightness and his/her pupils become red. It means that when the person's eyes look red-eyed, his/her pupils in each iris become red and the rest of the iris does not become red. Typically, people of Asian descent have brown or dark brown colored irises, and people of European descent have green or blue colored irises. Therefore, the reference situation for the selection condition "the person's eyes are not red-eyed" becomes "the red part in his/her iris has a small dimension".

When the selection condition "the person is looking at the camera" is selected, the judgement location may be the eye of the person. The reference situation for the eye in this selection condition will be determined as follows. When a person is looking at the camera, a line between the camera and the iris of the person and a normal vector of his/her iris are almost the same. Therefore, the reference situation for the selection condition "the person is looking at the camera" becomes "the normal vector of the iris in his/her eye is approximately equal to the angle of the line between the camera and his/her iris".

When the selection condition "the person is smiling" is selected, the judgement location may be the eyes and the mouth of the person. The reference situation for the eyes and the mouth in this selection condition will be determined as follows. When a person is smiling, although it depends on each person, his/her eyes become relatively thin. At this time, although it depends on each person, his/her mouth expands right-and-left wards and his/her teeth are shown. Therefore, the reference situations for the selection condition "the person is smiling" become "the white part in his/her eyes has a small dimension", "the width of his/her mouth is wide" and "the white area in his/her mouth has a large dimension".

The method of selecting a desired image from among the plurality of images will be explained in detail with reference to FIGS. 3 and 4.

Figure 3:
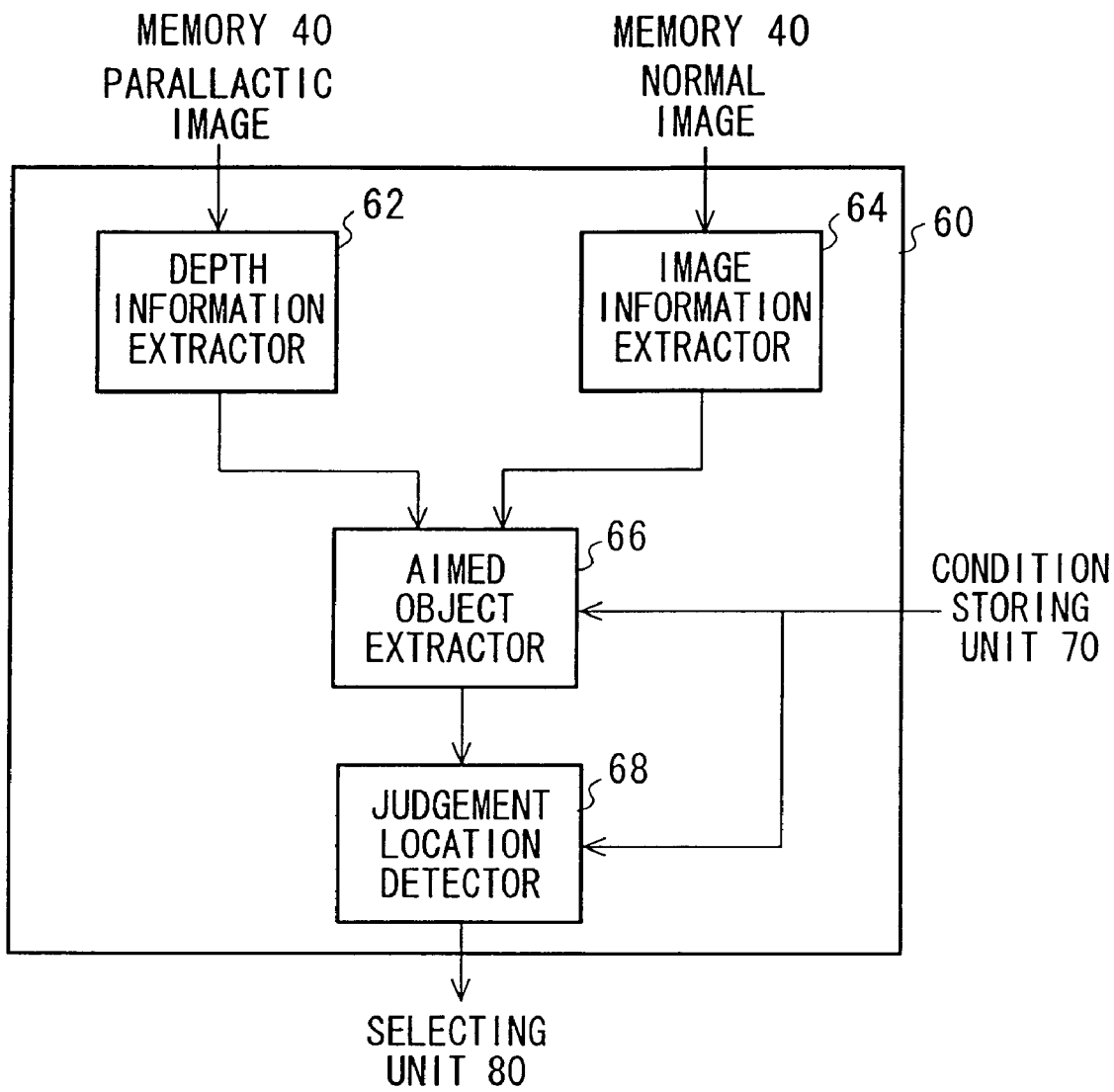
FIG. 3 is a functional block diagram of the extractor 60.

FIG. 3 is a functional block diagram of the extractor 60. The extractor 60 includes a depth information extractor 62, an image information extractor 64, an aimed object extractor 66 and a judgement location detector 68.

The depth information extractor 62 extracts the depth information indicating the distance to each of components of the subject, based on the data of the parallactic image received from the memory 40. It means that the depth information extractor 62 determines a corresponding point for each of the components based on the parallactic image and gives a parallax amount. The depth information extractor 62 extracts the depth information based on the parallax amount of each of the components. Determining the corresponding point is a known technique, thus the explanation of this technique will be omitted. Extracting the depth information based on the parallax amount is also a known technique using the principle of triangulation, thus the explanation of this technique will be omitted.

The image information extractor extracts the image information for normal images, from the data for the normal images received from the memory 40. The image information includes, for example, data of the normal image such as luminescence distribution, intensity distribution, color distribution, texture distribution, and motion distribution.

The aimed object extractor 66 extracts data for the face area of the person as the aimed object, based on the depth information and the image information. Each of the images may include, for example, a plurality of components. The aimed object extractor 66 recognizes each of the components based on the depth information. The aimed object extractor 66 then specifies the face area by referring to the depth information and the image information of each of the components. The method of specifying the face area will be described in the following.

The aimed object extractor 66 receives the selection condition from the condition-storing unit 70. The aimed object extractor 66 extracts the aimed object based on the selection condition. In this embodiment, the aimed object is the face of the photographed person. Therefore, at first, the component including the face is specified depending on assumptions such as "the person should be close to the camera", "the person should be in the middle of the image", or "the proportional relationship of the height of the person to the width and height of the image should be within a predetermined range". The distance from the camera to each of the components in the image is evaluated based on the depth information. The distance from the center of the image to each of the components in the image, and the proportional relationship of the height of the components are evaluated based on the image information. Each of the values is multiplied by predetermined constants corresponding to each condition. The multiplied values are added for each of the components. The added values are defined as weighted averages. The component having a largest weighted average is extracted as the component including the aimed object.

The constants by which the values for each of the components are multiplied may be predetermined based on the aimed object. In this embodiment, for example, the aimed object is assumed to be the face of the photographed person. Therefore, the aimed object extractor 66 specifies the area having a skin color as the face part, based on the image information. The colors of each of the components are evaluated based on the color distribution of the images. The values of the color distribution may also be multiplied by predetermined constants and the multiplied values are added for each of the components to give the weighted averages.

The judgement location detector 68 detects the judgement location from the data for the face area extracted by the aimed object extractor 66. The judgement location detector 68 receives the selection condition from the condition-storing unit 70. The judgement location detector 68 detects the judgement location based on the selection condition. In this embodiment, the judgement location is an eye or the mouth of the photographed person. Therefore, the judgement location detector 68 detects the eyes and mouth from the face area. There is relatively little variation in eyes of people with respect to color, shapes or their place on the face. Therefore, patterns of eyes such as the color of the eyes, shape of the eyes, and the place of the eyes on the face are previously determined, and the parts which are approximately similar to the determined patterns of the eyes are recognized as the judgement location in the face. Similarly, there is relatively little variation in mouths of people with respect to color, shapes or place on the face. Therefore, patterns of the mouth are also previously determined and the parts which are approximately similar to the determined patterns of the mouth are recognized as the judgement location in the face.

The judgement location detector 68 then outputs the data for the detected judgement locations to the selecting unit 80.

Figure 4:
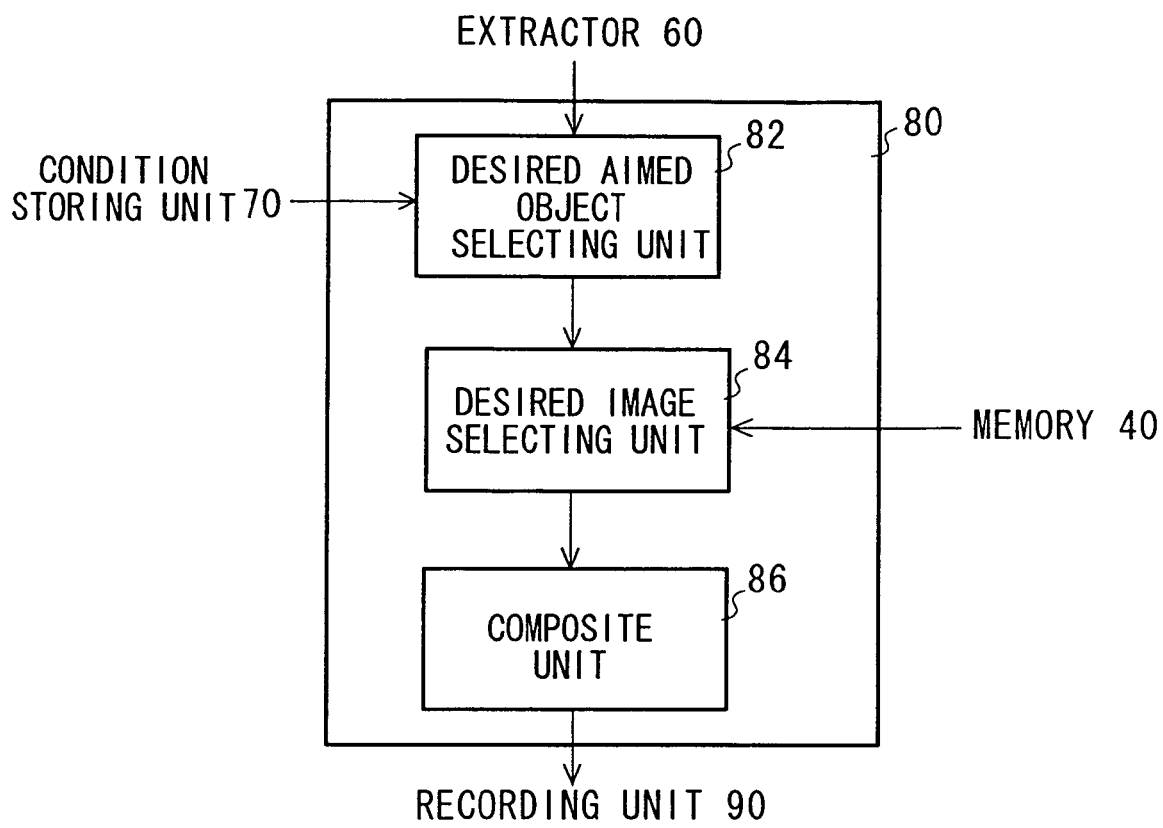
FIG. 4 is a functional block diagram of the selecting unit 80.

FIG. 4 is a functional block diagram of the selecting unit 80. The selecting unit 80 includes a desired-aimed-object-selecting unit 82, a desired-image-selecting unit 84 and an image-composite unit 86. The desired-aimed-object-selecting unit 82 receives the data of the detected judgement locations from the extractor 60. The desired-aimed-object-selecting unit 82 receives the selection condition from the condition-storing unit 70. The desired-aimed-object-selecting unit 82 compares each of the judgement locations based on the reference situation for the selection condition. The desired aimed-object-selecting unit 82 then selects the judgement location which best satisfies the reference situation for the selection condition.

When the selection condition "the person is not blinking" is selected, the judgement location is the eyes and the reference situation is "the white part of his/her eyeball has a large dimension", as described above. Therefore, the desired-aimed-object-selecting unit 82 calculates the dimension of the white part of the eye detected by the judgement location detector 68 for each of the images, based on the image information. The desired-aimed-object-selecting unit 82 selects the eye having the largest dimension of the white part as the desired judgement location. People usually blink both eyes at a same time, therefore, the desired-aimed-object-selecting unit 82 may check only one of the eyes of the photographed person. However, by checking both eyes, the desired judgement location can be selected more precisely.

When the selection condition "the person's eyes are not red-eyed" is selected, the judgement location is the eyes and the reference situation is "the red part in his/her iris has a small dimension", as described above. Therefore, the desired-aimed-object-selecting unit 82 calculates the dimension of the red part in the iris of the eye detected by the judgement location detector 68 for each of the images, based on the image information. The iris of his/her eye is recognized as being a cylindrical or elliptic area whose circumference has a brown or dark brown color. The desired-aimed-object-selecting unit 82 selects the eye having the smallest dimension of the red part as the desired judgement location. Both eyes of people are usually red eyed at the same time, therefore, the desired-aimed-object-selecting unit 82 may check only one of the eyes of the photographed person. However, by checking both of his/her eyes, the desired judgement location can be selected more precisely.

When the selection condition "the person is looking at the camera" is selected, the judgement location is the eye and the reference situation is "the normal vector of the iris in his/her eye is approximately equal to the angle of the line between the camera and his/her iris", as described above. Therefore, the desired-aimed-object-selecting unit 82 recognizes the iris as being a cylindrical or elliptic area whose circumference has a brown or dark brown color. The desired-aimed-object-selecting unit 82 then recognizes the center of the iris and the normal vector of the center of the iris. The desired-aimed-object-selecting unit 82 selects the eye having the normal vector of the iris which is closest to the line between the camera and the iris, as the desired judgement location.

The normal vector of the iris can be obtained from the relative position of the camera and the face of the person, the relative position of the face and the eyes of the person, and the relative position of the eyes and the irises of the person. The desired-aimed-object-selecting unit 82 may select the desired judgement location based on the normal vector obtained from these relative positions.

When the selection condition "the person is smiling" is selected, the judgement location is the eyes or the mouth and the reference situation is "the white part in his/her eye has a small dimension", "the width of his/her mouth is wide" or "the white part in his/her mouth has a large dimension", as described above. Therefore, the desired-aimed-object-selecting unit 82 calculates the dimension of the white part of the eye, the width of the mouth, and the dimension of the white part of the mouth detected by the judgement location detector 68 for each of the images, based on the image information. The desired-aimed-object-selecting unit 82 selects the eye having the smallest dimension of the white part, the mouth having the widest width, or the mouth having the largest dimension of the white part as the desired judgement location.

The desired-aimed-object-selecting unit 82 selects the aimed object including the desired judgement location selected by the operation, as described above.

The desired-image-selecting unit 84 selects the desired image by specifying the image including the desired judgement location.

As described above, the control unit 50 extracts the face of the photographed person as the aimed object and detects the judgement location from each of the aimed objects. The control unit 50 then selects a desired judgement location most satisfying the selection condition. Thus, the control unit 50 automatically selects a desired image including the desired judgement location from among the plurality of images, without bothering the photographer or the photographed person.

The method of selecting a desired image when a plurality of people is photographed will be explained next.

When each of the images includes a plurality of people, the extractor 60 extracts the aimed object and detects the judgement locations for each of the people. It means that the aimed object extractor 66 extracts the face parts for each of the people from each of the images. The judgement location extractor 68 detects the eyes or the mouth for each of the people from each of the images.

When each of the images includes a plurality of people, the desired-aimed-object-selecting unit 82 selects the desired aimed objects each respectively including the desired judgement locations selected for each of the people. The desired-image-selecting unit 84 specifies desired aimed images, each respectively including the desired aimed object for each of the people.

The desired image may be different for each person when a plurality of people is photographed. Therefore, the image-composite unit 86 composes the desired aimed objects for each of the photographed people selected by the desired-aimed-object-selecting unit 82 and forms a composite image. The image-composite unit 86 outputs the composite image to the recording unit 90.

The image-composite unit 86 normally does not composite the images when only one person is photographed. However, there may be a problem even when one person is photographed. For example, the image itself may not be desirable although the aimed object included in the image is desirable, because the face part and the other subjects in the image have different tone levels. In such a case, the image-composite unit 86 composites the desired aimed object with a desirable image having a desirable background.

In addition, as the data of the face part of the person can be extracted from the data of the image, the face part and the rest of the image may be separately corrected and then may be composited, by the image-composite unit 86. For example, when compressing the image, the face part and the image may be separately compressed so that the face part can be less compressed and may be composited by the image-composite unit 86. Furthermore, only the face part may be magnified and may be composed with the original background so that the face part can be emphasized.

Figure 5:
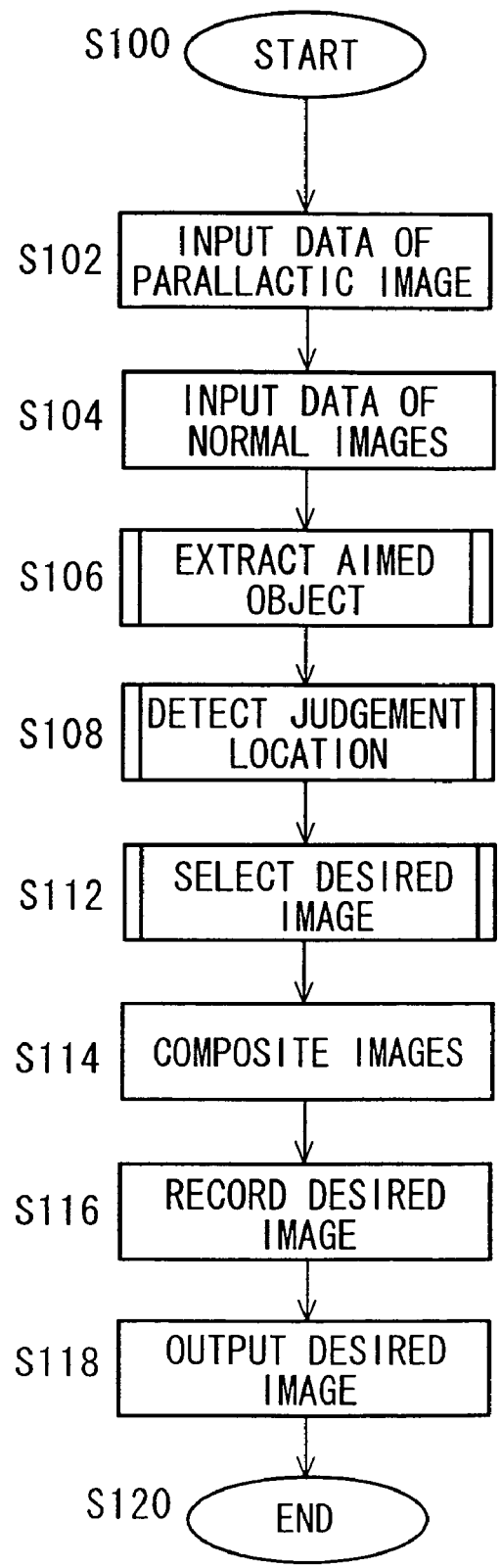
FIG. 5 is a flowchart showing the method of selecting a desired image from among a plurality of images photographed by the camera 10.

FIG. 5 is a flowchart showing the method of selecting a desired image from among the plurality of images photographed by the camera 10. The camera 10 starts photographing the subject when a release button is pushed (S100). When the camera 10 starts photographing, data of a parallactic image are input from the parallactic image data input unit (S102). At the same time, data of a plurality of normal images are input from the normal image data input unit (S104). The extractor 60 extracts the face part of the photographed person as the aimed object based on the depth information and the image information (S106). The extractor 60 then detects the judgement location based on the image information of the face part (S108). The selecting unit 80 selects a desired image from among the plurality of normal images including a desired aimed object whose judgement location satisfies the selection condition (S112).

The selection unit 80 then composites the selected desired images if necessary (S114).

The desired image is output to the recording unit 90. The recording unit 90 records the received desired image (S116). The desired image recorded on the recording unit is output from the output unit 92.

Figure 6:
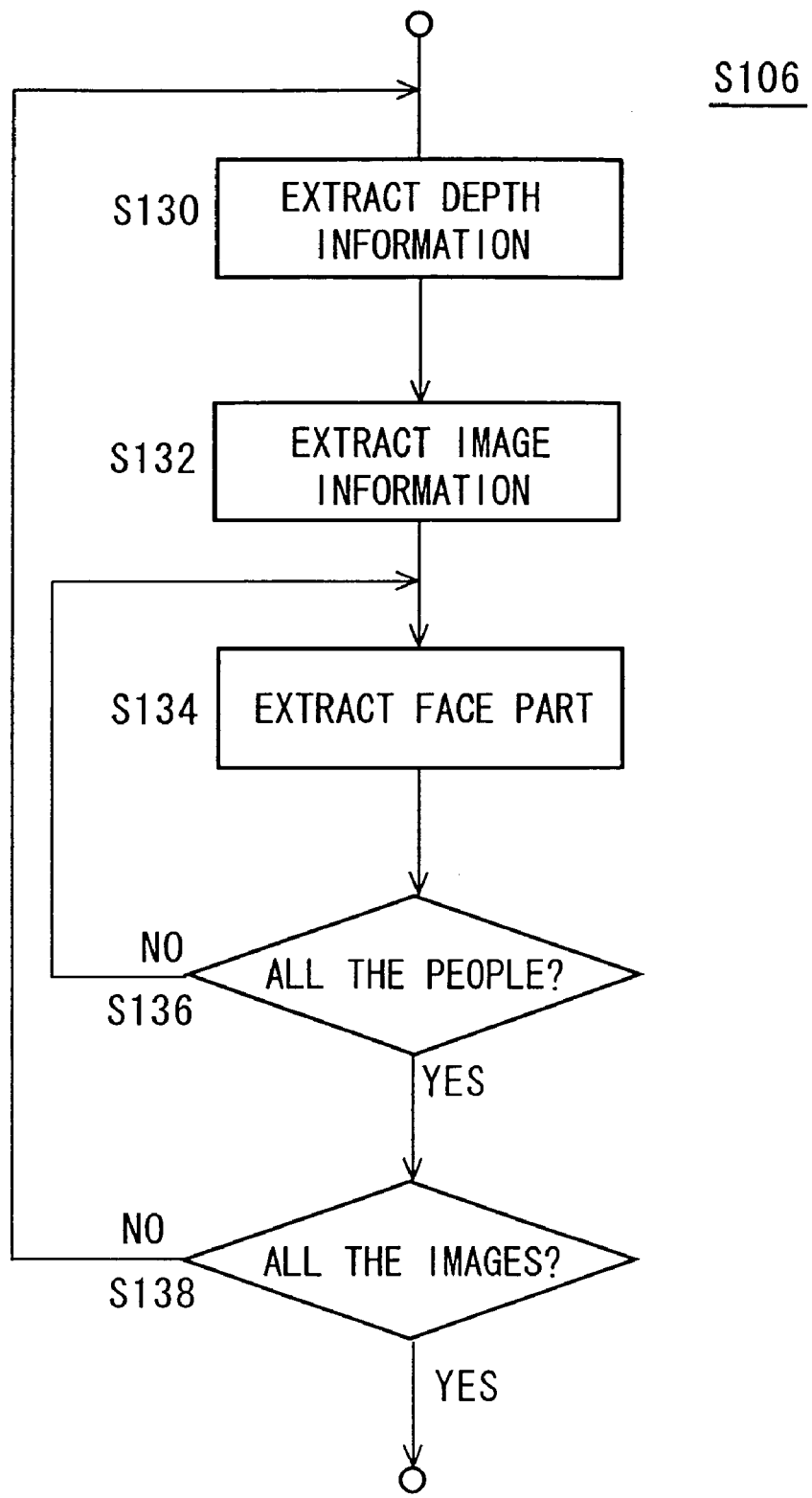
FIG. 6 is a flowchart showing in detail the method of extracting a face part, step 106 in FIG. 5.

FIG. 6 is a flowchart showing in detail the method of extracting the face part as the aimed object (S106) of FIG. 5. The depth information is extracted based on the parallactic image (S130), and the image information is extracted based on each of the normal images (S132). The face part of the photographed person is extracted from each of the images based on the depth information and the image information (S134). When each of the images includes a plurality of people, the aimed-object-extracting unit 66 extracts the face parts for all of the people from each of the images (S136). This extracting method is repeatedly done for each of the images (S138). When the data of the face parts are extracted from all of the images, the process moves to the next step S108.

Figure 7:
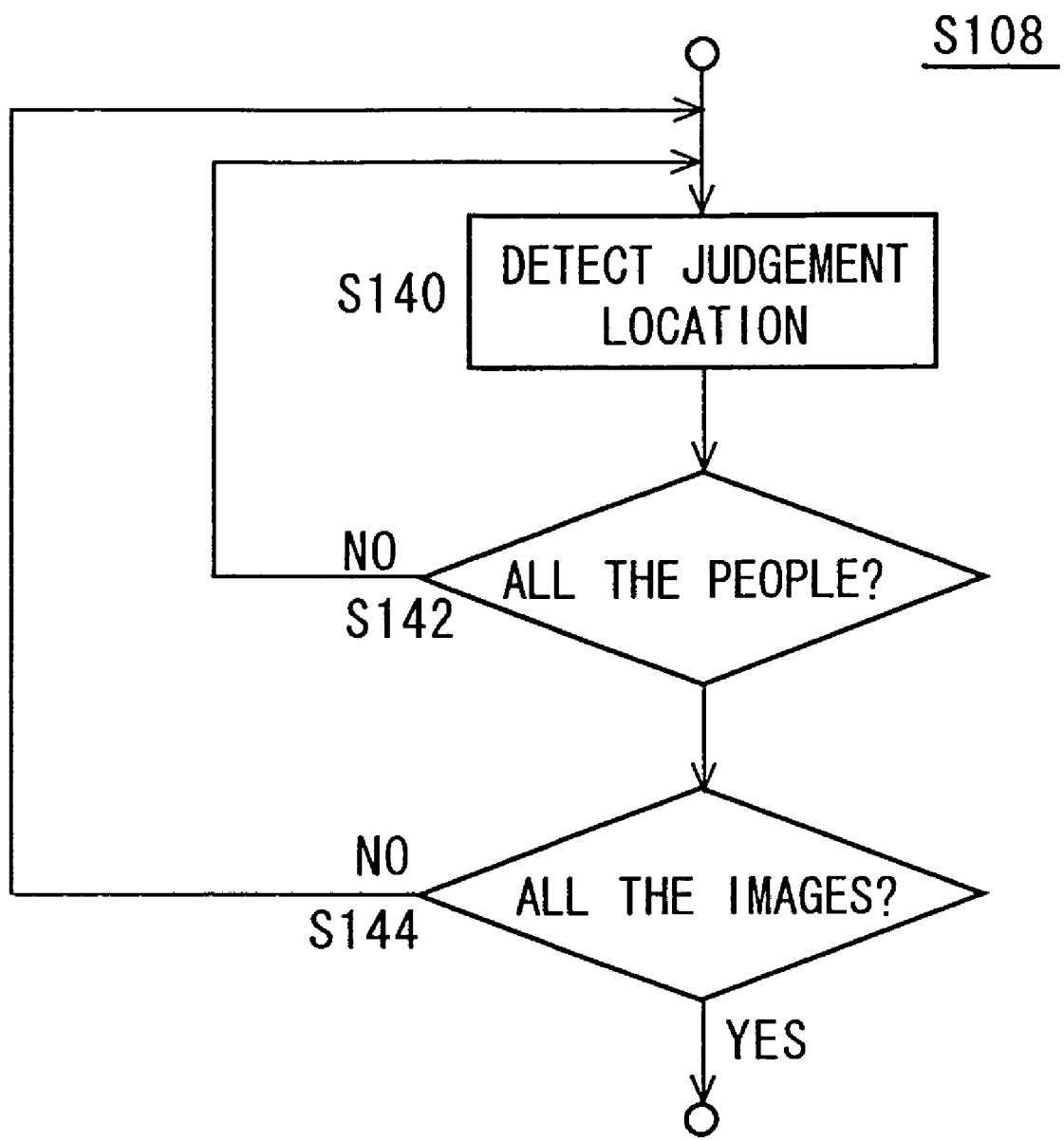
FIG. 7 is a flowchart showing in detail the method of detecting a judgement location, step 108 in FIG. 5.

FIG. 7 is a flowchart showing in detail the method of detecting the judgement location (S108) of FIG. 5. The judgement location is detected based on the image information of each of the faces (S140). When each of the images includes a plurality of people, the judgement-location-detecting unit 68 detects the judgement locations for all of the people from each of the images (S142). This detecting method is repeatedly done for each of the images (S144). When the data for the judgement locations are detected from all of the images, the process moves to the next step S112.

Figure 8:
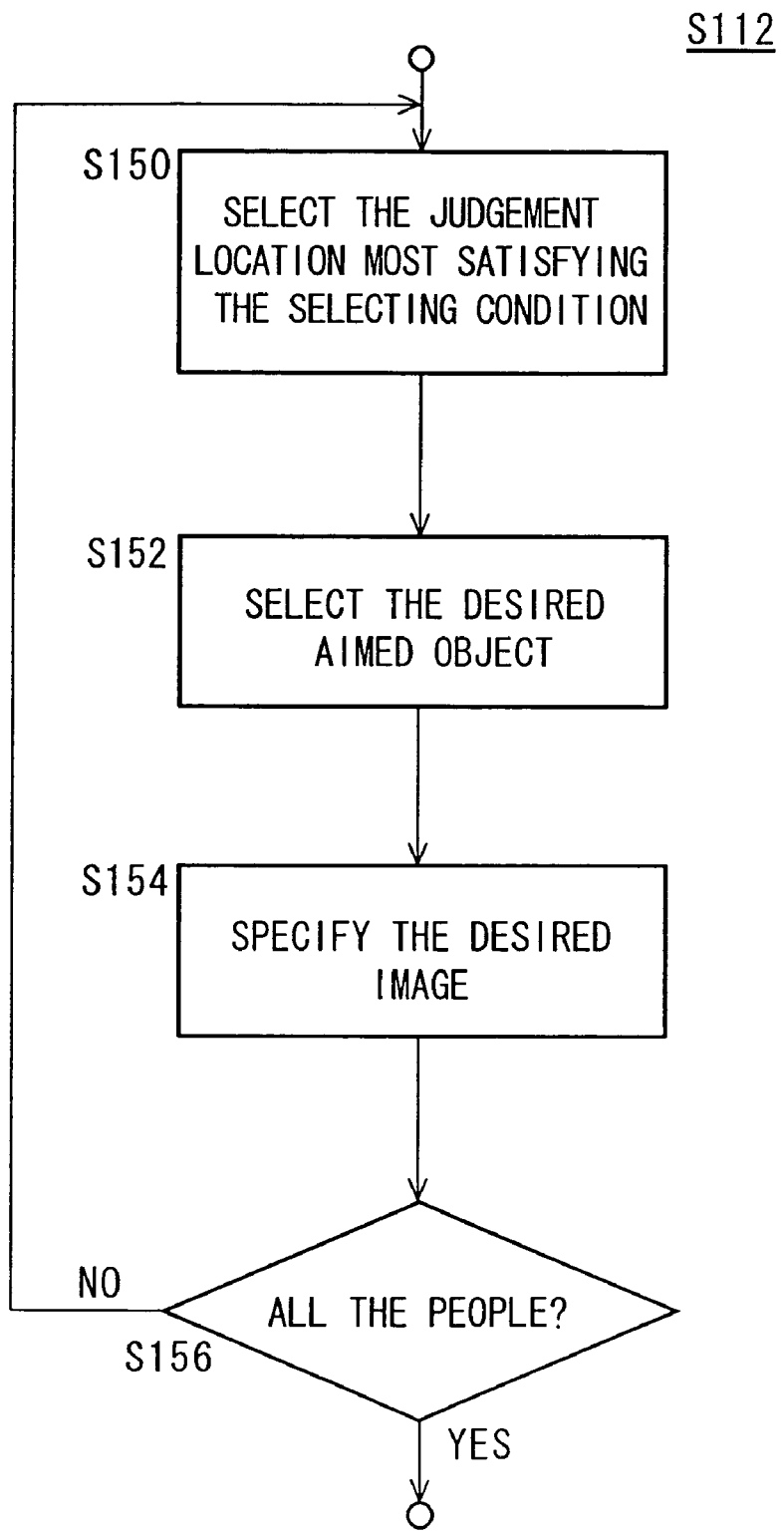
FIG. 8 is a flowchart showing in detail the method of selecting a desired image, step 112 in FIG. 5.

FIG. 8 is a flowchart showing in detail the method of selecting the desired image (S112) of FIG. 5. The data of the judgement location detected in the step 108 is compared for each of the images, based on the reference situation corresponding to each of the selection conditions. The desired-aimed-object-selecting unit 82 selects the judgement location most satisfying the selection condition, as the desired aimed object (S150). The desired-aimed-object-selecting unit 82 then selects the aimed object including the desired judgement location, as the desired aimed object (S152). The desired-image-selecting unit 84 specifies the image including the desired aimed object as the desired image (S154). When each of the images includes a plurality of people, the desired images are selected for all of the people (S156).

Figure 9:
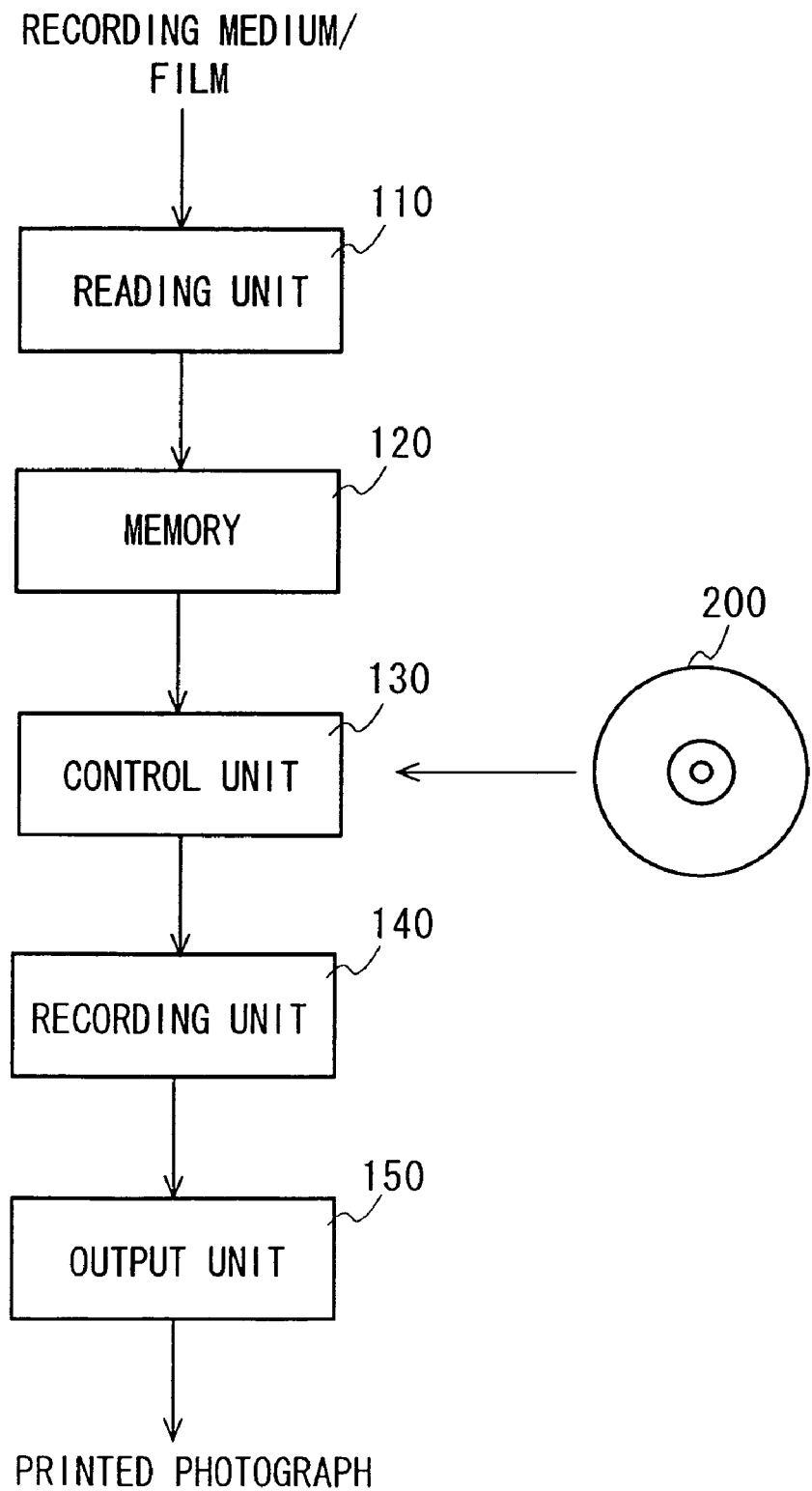
FIG. 9 shows a Laboratory system of the second embodiment according to the present invention.

FIG. 9 shows an image selecting apparatus of the second embodiment according to the present invention. The image selecting apparatus in this embodiment is a laboratory system. The laboratory system of this embodiment includes a reading unit 110, a memory 120, a control unit 130, a recording unit 140 and an output unit 150.

The reading unit 110 reads data of a plurality of images and information related to each of the images from a recording medium for a digital camera, or a film. The reading unit 110 may be a floppy disk drive, for example, and reads the data of the images and the information from a floppy disk or a removable flash memory. The reading unit 110 may have a communication unit through which data of a plurality of images photographed by a digital camera and information related to each of the images are transmitted over a computer network such as the internet. Thus, the reading unit 110 can read the data of the images and the information thereof.

The reading unit 110 may be a film scanner, for example, and reads the data of the images and the information thereof from a film. There is provided in the film a space for the information related to the images. The reading unit 110 reads data of the images and the information related to each of the images.

The memory 120 stores the data of the plurality of images and the information thereof read by the reading unit 110. In this embodiment, the memory 120 stores depth information and image information as the information related to the images.

The control unit 130 has a same function as the control unit 50 of the camera 10 according to the first embodiment. The control unit 130 selects a desired image most satisfying the selection conditions from among a plurality of images stored in the memory 120. The control unit 130 extracts a face part of a person in the image based on the depth information and the image information stored in the memory 120. The control unit 130 then detects the judgement location based on the image information of the extracted face part.

As for the films, the space for information related to the images is not large, therefore, only the image information related to the face part of the person may be written. In this case, the judgement location is detected based on the image information of the face part written of the film. As for the recording medium of the digital camera, parallactic images may be stored in the recording medium, and the depth information may be extracted based on the parallactic images.

The control unit 130 selects a desired aimed object satisfying the selection condition, based on the detected judgement location. The control unit 130 then selects a desired image from among the plurality of images. The desired image selected by the control unit 130 is recorded on the recording unit 140. The desired image recorded on the recording unit 140 is output from the output unit 150. The output unit 150 may be a color laser printer, or a digital printer.

The image selecting apparatus may be a workstation, or a system using a computer such as a personal computer. The computer serves as the memory 120, the control unit 130 and the recording unit 140 shown in FIG. 9. Peripheral apparatus that together compose the system with the computer, may serve as the reading unit 110 and the output unit 150 shown in FIG. 9.

As for the image selecting apparatus, the method of selecting a desired image from among a plurality of images may be provided with a software program stored in a recording medium 200 shown in FIG. 9. In this case, the recording medium 200 stores therein a program executed by a computer, to perform a method comprising extracting data of an aimed object from each of the plurality of images, and selecting a desired image including a desired aimed object from among the plurality of images, the desired aimed object satisfying a predetermined selection condition for a desirable aimed object.

As described above, the control unit 130 extracts the face part of the photographed person as the aimed object and detects the judgement location from each of the aimed objects. The control unit 130 then selects a desired aimed object including the judgement location most satisfying the selection condition, based on the detected judgement location. Thus, the control unit 130 automatically selects a desired image including the desired aimed object from among the plurality of images, without bothering the photographer or the photographed person.

Furthermore, even when a lot of people are photographed in an image, the face parts are extracted for each of the people. Then, the desired face part including the judgement location most satisfying the selection condition is selected for each of the people. Therefore, by compositing the desired aimed objects for each of the people, a desired image can be automatically obtained.

As described above, a desired image satisfying a predetermined selection condition can be selected from among a plurality of images according to the present invention.

Although the present invention has been described by way of exemplary embodiments, it should be understood that many changes and substitutions may be made by those skilled in the art without departing from the spirit and the scope of the present invention which is defined only by the appended claims.

What is claimed is:

1. An image selecting apparatus for selecting a desired image from among a plurality of images obtained by continuously photographing a subject, comprising:

an extractor extracting data of an aimed object from each of said plurality of images, said aimed object corresponding to an independent object within the image at which a photographer aims;

a condition-storing unit storing a plurality of predetermined selection conditions for a desirable aimed object, each of the stored predetermined selection conditions being specified by a user; and a selecting unit selecting at least one selection condition from among the plurality of predetermined selection conditions resulting in a selection of a desired image including a desired aimed object from among said plurality of images, said desired aimed object being an aimed object which satisfies said at least one selection condition stored in said condition-storing unit, wherein said extractor extracts said data of said aimed object based on depth information indicating a distance from the photographer's camera to at least one part of said subject, said extractor extracts data of a first aimed object and data of a second aimed object from each of said plurality of images, said selecting unit selects said desired aimed object of the first aimed object for a first image and selects said desired aimed object of the second aimed object for a second image, and said selecting unit further comprises an image-composite unit compositing said desired aimed object of the first aimed object and said desired aimed object of the second aimed object to form a composite image, said composite image including said desired aimed object of the first aimed object extracted from said first image and said desired aimed object of the second aimed object extracted from said second image.

2. An image selecting apparatus as set forth in claim 1, wherein said extractor extracts said data of said aimed object based on image information included in each of said images.

3. An image selecting apparatus as set forth in claim 1, wherein said extractor detects a judgement location from said data of said aimed object based on image information included in each of said images, said at least one selection condition includes a predetermined selection condition related to a desirable judgement location, and said selecting unit selects said desired aimed object including a judgement location satisfying said at least one selection condition related to said desirable judgement location.

4. An image selecting apparatus as set forth in claim 1, wherein said extractor detects a plurality of judgement locations from each of said data of said plurality of aimed objects based on image information included in each of said images, said at least one selection condition includes a predetermined selection condition related to a desirable judgement location, and said selecting unit selects a plurality of said desired aimed objects each including a judgement location satisfying said at least one selection condition related to said desirable judgement location.

5. The image selecting apparatus as set forth in claim 1, wherein said conditions relate to at least one of a shape, color or size of the aimed object.

6. An image selecting apparatus as set forth in claim 1, wherein said at least one predetermined selection condition relates to expression of said aimed object for identifying said desired aimed object.

7. An image selecting apparatus as set forth in claim 1, wherein said selecting unit selects said desired image without an operation of a user.

8. An image selecting apparatus as set forth in claim 1, wherein at least one of the predetermined conditions is selected in advance by the user from a plurality of potential selection conditions.

9. A method in an apparatus for compositing a desired image from among a plurality of images obtained by continuously photographing a subject, comprising:

extracting data of an aimed object from each of said plurality of images, said aimed object corresponding to an independent object within the image at which a photographer aims; and selecting a desired image including a desired aimed object from among said plurality of images, said desired aimed object being an aimed object which satisfies a predetermined selection condition for a desirable aimed object, said predetermined selection condition being specified by a user, wherein said extracting extracts said data of said aimed object from each of said plurality of images based on depth information indicating a distance from the photographer's camera to at least one part of said subject, said extracting extracts data of a first aimed object and data of a second aimed object from each of said plurality of images, said selecting selects said desired aimed object of the first aimed object for a first image for a first image and selects said desired aimed object of the second aimed object for a second image, and said selecting further comprises compositing said desired aimed object of the first aimed object and said desired aimed object of the second aimed object to form a composite image, said composite image including said desired aimed object of the first aimed object extracted from said first image and said desired aimed object of the second aimed object extracted from said second image.

10. A method as set forth in claim 9, wherein said extracting extracts said data of said aimed object from each of said plurality of images based on image information included in each of said images.

11. A method as set forth in claim 9, wherein said extracting includes detecting a judgement location from said data of said aimed object, said selection condition includes a predetermined selection condition related to a desirable judgement location, and said selecting selects said desired aimed object including a judgement location satisfying said selection condition related to said desirable judgement location.

12. A method as set forth in claim 9, wherein said extracting includes detecting a plurality of judgement locations from each of said data of said plurality of aimed objects, said selection condition includes a predetermined selection condition related to a desirable judgement location, and said selecting selects a plurality of said desired aimed objects each including a judgement location satisfying said selection condition related to said desirable judgement location.

13. A method as set forth in claim 9, wherein said predetermined selection condition relates to expression of said aimed object for identifying said desired aimed object.

14. A method as set forth in claim 9, wherein said selecting step selects said desired image without an operation of a user.

15. A method as set forth in claim 9, wherein the predetermined selection condition is selected in advance by the user from a plurality of potential selection conditions.

16. A recording medium storing therein a program executed by a computer to perform a method of compositing a desired image from among a plurality of images obtained by continuously photographing a subject, comprising:

extracting data of an aimed object from each of said plurality of images, said aimed object corresponding to an independent object within the image at which a photographer aims; and selecting a desired image including a desired aimed object from among said plurality of images, said desired aimed object being an aimed object which satisfies a predetermined selection condition for a desirable aimed object, said predetermined selection condition being specified by a user, wherein said extracting extracts said data of said aimed object from each of said plurality of images based on depth information indicating a distance from the photographer's camera to each at least one part of said subject, said extracting extracts data of a first aimed object and data of a second aimed object from each of said plurality of images, said selecting selects said desired aimed object of the first aimed object for a first image and selects said desired aimed object of the second aimed object for a second image, and said selecting further comprises compositing said desired aimed object of the first aimed object and said desired aimed object of the second aimed object to form a composite image, said composite image including said desired aimed object of the first aimed object extracted from said first image and said desired aimed object of the second aimed object extracted from said second image.

17. A recording medium as set forth in claim 16, wherein said predetermined selection condition relates to expression of said aimed object for identifying said desired aimed object.

18. A recording medium as set forth in claim 16, wherein said selecting step selects said desired image without an operation of a user.

19. A method as set forth in claim 16, wherein the predetermined selection condition is selected in advance by the user from a plurality of potential selection conditions.

* * * * *